W. SMITH.
FLOUR SCOOP AND SIFTER.
No. 337,711. Patented Mar. 9, 1886.
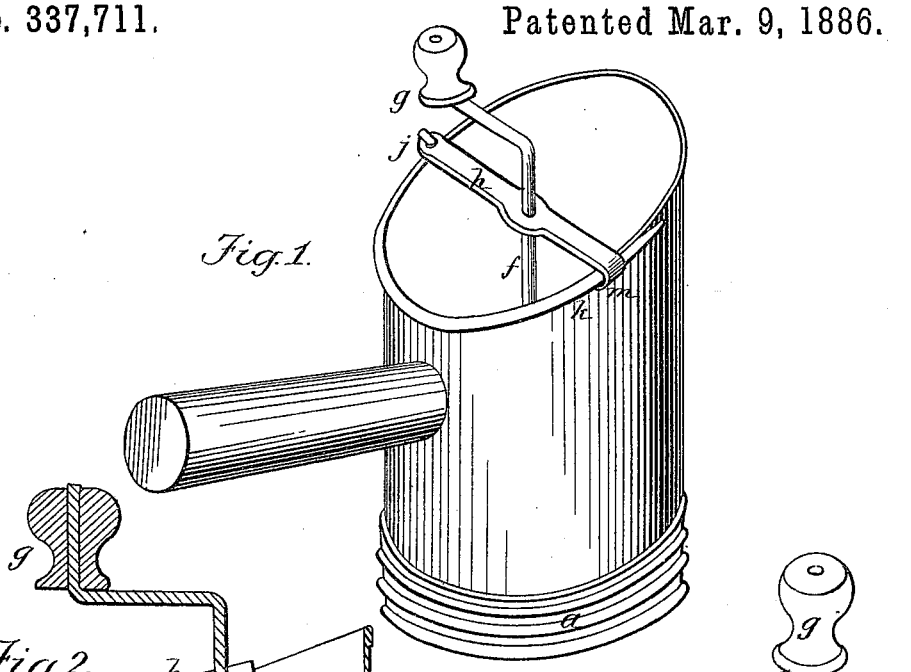
Fig. 1.
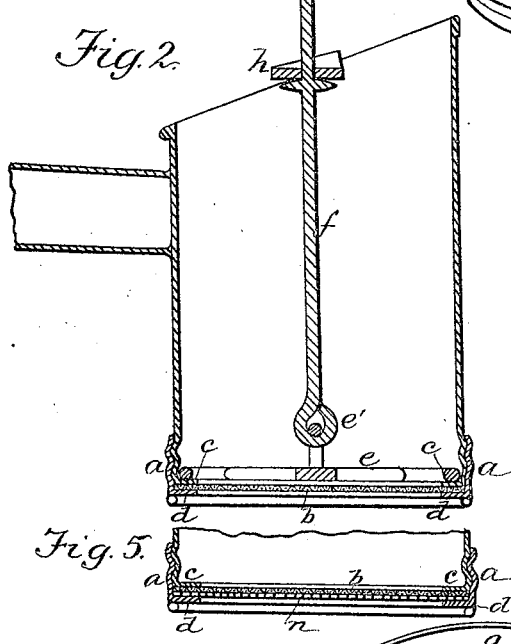
Fig. 2.
Fig. 5.
Fig. 4.
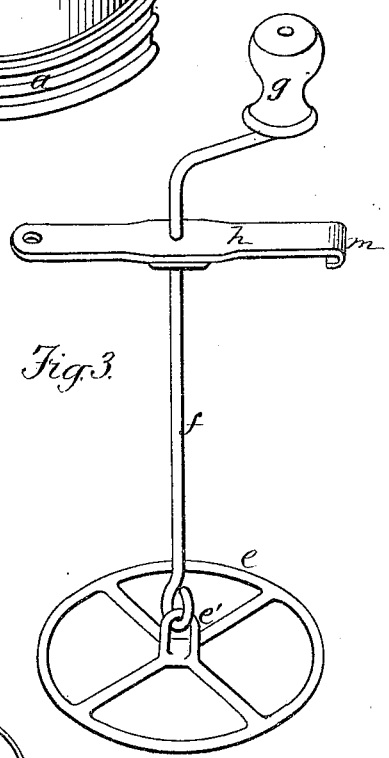
Fig. 3.
WITNESSES
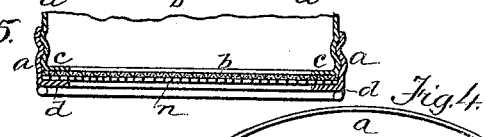
INVENTOR
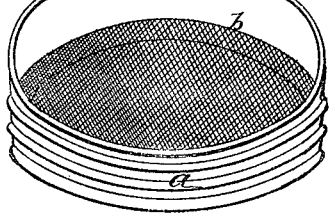
by Johnson & Johnson
Attorneys.

UNITED STATES PATENT OFFICE.

WILLIAM SMITH, OF CICERO, INDIANA.

FLOUR SCOOP AND SIFTER.

SPECIFICATION forming part of Letters Patent No. 337,711, dated March 9, 1886.

Application filed November 3, 1885. Serial No. 181,768. (No model.)

*To all whom it may concern:*

Be it known that I, WILLIAM SMITH, a citizen of the United States, residing at Cicero, in the county of Hamilton and State of Indiana, have invented new and useful Improvements in Flour Scoops and Sifters, of which the following is a specification.

I have improved the hand flour scoop and sifter in the provision for using sieves of different mesh—one re-enforcing the other; in the provision for attaching a removable agitator to the top of the scoop and supporting it free of pressure upon the screen, whereby the latter is rendered more durable, and in the provision for removing and replacing the screens and clamping them in the open bottom of the scoop.

In the drawings, Figure 1 represents my improved scoop and sifter in perspective; Fig. 2, a vertical section; Fig. 3, the self-adjusting agitator; Fig. 4, the removable screw-cap for containing the sieves, and Fig. 5 the sieves of different mesh.

The open bottom of the scoop has a spun screw thereon, and a screw-spun ring, $a$, is adapted to contain the sieve or sieves and to be screwed upon the scoop and clamp the sieves upon the bottom of the scoop, so that the sieves have a fixed relation to the agitator. The bottom edge of the scoop may have an inwardly-turned rim, $c$, to form a seat for the self-adjusting agitator, and a means by which the screw-ring $a$ clamps the sieve to the scoop. The screw-ring has an inwardly-turned seat, $d$, for the sieves, and one or more sieves may be used, such as a fine-wire sieve, $b$, re-enforced by an under stronger one, $n$, Fig. 5, of thin sheet metal of coarser perforations, rendering the sieve $b$ much more durable and sustaining it under the action of the agitator. By unscrewing the ring $a$ the sieve can be changed as may be desired.

The agitator may be of any suitable skeleton form, jointed to the operating-rod, so as to render it self-adjusting in relation to the sieve. As shown, the agitator consists of an armed ring, $e$, centrally jointed by an eye, $e'$, to the end of its operating-rod $f$, so as to be suspended from said rod. The suspension of the agitator allows it to rest upon its rim-seat or upon the sieve with a perfectly self-adjusting action, and thereby facilitate the sifting and relieve the screen from undue wear. The agitator-rod $f$ has a crank-handle, $g$, and is held in place by a cross-bar, $h$, connected, with adaptation for removal, to the top of the scoop.

The means shown for centrally holding the rod consists of a clamp cross-bar attached by hook and eye $j$ at one end to one side of the scoop, and its other hook end, $m$, is locked under an inclined rib, $k$, on the top edge of the scoop, so as to clamp the bar to the scoop and hold the agitator in central position. By unlocking the cross-bar the agitator can be removed from the scoop, so that the latter may be used as a scoop only.

The cross-bar may be applied to inclines on each side of the scoop—that is, the incline $k$ may be extended to the other side of the scoop and both ends of the cross-bar may be hooked. The self-adjusting agitator being seated upon the rim $c$, can be pressed down to hold it close to the sieve without pressing upon the latter.

I claim—

1. The combination, with a self-adjusting agitator having an armed ring, $e$, of a scoop having an inward rim, $c$, forming a seat for said agitator-ring, and a sieve clamped to said seat-rim, whereby said agitator is supported free of contact with said sieve, as shown and described.

2. The scoop having the screw-spun lower end terminating in an inward seat-rim, $c$, combined with a screw-spun ring having an inward rim-seat, $d$, one or more sieves clamped by and between said seat-rims, and an agitator having an armed ring, $e$, seated upon the scoop-rim, and thereby supported free of contact with said sieve, substantially as described.

3. The combination, with the scoop having the bottom screw, of a screw-spun ring rimmed at its lower edge, and one or more sieves seated upon said rim and clamped thereby to the scoop, as shown and described.

4. The scoop having the top inclined rib and one or more bottom screens, combined with an agitator and top-retaining cross-bar removably confined to said top rib, substantially as shown and described.

5. The scoop having the bottom screw and the seat-rim, in combination with the screw-ring having the seat-rim, one or more screens placed between the said rims and clamped by said ring, substantially as described.

6. The combination, with the sifting-scoop having a top edge, inclined rib, and an opposite side hook, of an agitator, and a top-confining cross-bar for said agitator having a hook at one end and an eye at its other end, whereby the agitator may be applied and removed, as described.

In testimony whereof I have hereunto set my hand in the presence of two subscribing witnesses.

WILLIAM SMITH.

Witnesses:
　DAVID R. MUNSON,
　W. SWAN.